United States Patent
Duan et al.

(10) Patent No.: US 11,863,586 B1
(45) Date of Patent: Jan. 2, 2024

(54) INLINE PACKAGE NAME BASED SUPPLY CHAIN ATTACK DETECTION AND PREVENTION

(71) Applicant: Palo Alto Networks, Inc., Santa Clara, CA (US)

(72) Inventors: Ruian Duan, Santa Clara, CA (US); Daiping Liu, Sunnyvale, CA (US); Jun Wang, Fremont, CA (US); Zihang Xiao, Los Gatos, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 17/957,650

(22) Filed: Sep. 30, 2022

Related U.S. Application Data

(60) Provisional application No. 63/402,294, filed on Aug. 30, 2022.

(51) Int. Cl.
 *H04L 9/40* (2022.01)
(52) U.S. Cl.
 CPC ...... *H04L 63/1466* (2013.01); *H04L 63/0263* (2013.01)
(58) Field of Classification Search
 CPC .......................... H04L 63/1466; H04L 63/0263
 See application file for complete search history.

(56) References Cited

U.S. PATENT DOCUMENTS

| | | | | |
|---|---|---|---|---|
| 10,346,611 | B1 * | 7/2019 | Mao | G06F 21/56 |
| 11,470,044 | B1 * | 10/2022 | Briliauskas | H04L 63/1483 |
| 2005/0125410 | A1 * | 6/2005 | Cotner | G06F 16/284 |
| 2010/0192201 | A1 * | 7/2010 | Shimoni | G06F 21/55 726/3 |
| 2011/0078309 | A1 * | 3/2011 | Bloch | H04L 63/168 709/224 |
| 2018/0084002 | A1 * | 3/2018 | Shnitzer | H04L 63/1416 |
| 2018/0176326 | A1 * | 6/2018 | Shantharam | H04L 69/329 |
| 2022/0200962 | A1 * | 6/2022 | Nilekar | H04L 63/0263 |

OTHER PUBLICATIONS

Duan et al., Towards Measuring Supply Chain Attacks on Package Managers for Interpreted Languages, Network and Distributed Systems Security (NDSS) Symposium 2021, Feb. 2021.

\* cited by examiner

*Primary Examiner* — Amie C. Lin
(74) *Attorney, Agent, or Firm* — Van Pelt, Yi & James LLP

(57) ABSTRACT

Inline package name based supply chain attack detection and prevention is disclosed. An indication that a client device has made a request to a remote server for a package is received. A data appliance then performs an action responsive to the received indication. In an example implementation, the data appliance makes a determination of whether the request for the package is associated with a nonexisting package.

25 Claims, 6 Drawing Sheets

```
"dependencies": {
  "express": "^4.3.0",
  "dustjs-helpers": "~1.6.3",
  "continuation-local-storage": "^3.1.0",
  "pplogger": "^0.2",
  "auth-paypal": "^2.0.0",
  "wurfl-paypal": "^1.0.0",
  "analytics-paypal": "~1.0.0"
}
```

402

404

FIG. 4

INLINE PACKAGE NAME BASED SUPPLY CHAIN ATTACK DETECTION AND PREVENTION

CROSS REFERENCE TO OTHER APPLICATIONS

This application claims priority to U.S. Provisional Patent Application No. 63/402,294 entitled INLINE PACKAGE NAME BASED SUPPLY CHAIN ATTACK DETECTION AND PREVENTION filed Aug. 30, 2022 which is incorporated herein by reference for all purposes.

BACKGROUND OF THE INVENTION

Malware is a general term commonly used to refer to malicious software (e.g., including a variety of hostile, intrusive, and/or otherwise unwanted software). Example uses of malware include disrupting computer and/or computer network operations, stealing proprietary information (e.g., confidential information, such as identity, financial, and/or intellectual property related information), and/or gaining access to private/proprietary computer systems and/or computer networks. Malware can be in the form of code, scripts, active content, and/or other software. Package managers allow developers to improve the efficiency of writing and building code. Unfortunately, due in part to their popularity, package managers have recently become a target of attackers, for example, as a mechanism for malware distribution. Package manager attacks can be particularly problematic because they can also serve as an attack vector used in supply chain attacks. Accordingly, there is an ongoing need for improvements to techniques for mitigating malware, including its propagation via package manager attacks.

BRIEF DESCRIPTION OF THE DRAWINGS

Various embodiments of the invention are disclosed in the following detailed description and the accompanying drawings.

FIG. 4 illustrates a portion of a package.json file.

DETAILED DESCRIPTION

Figure 1:
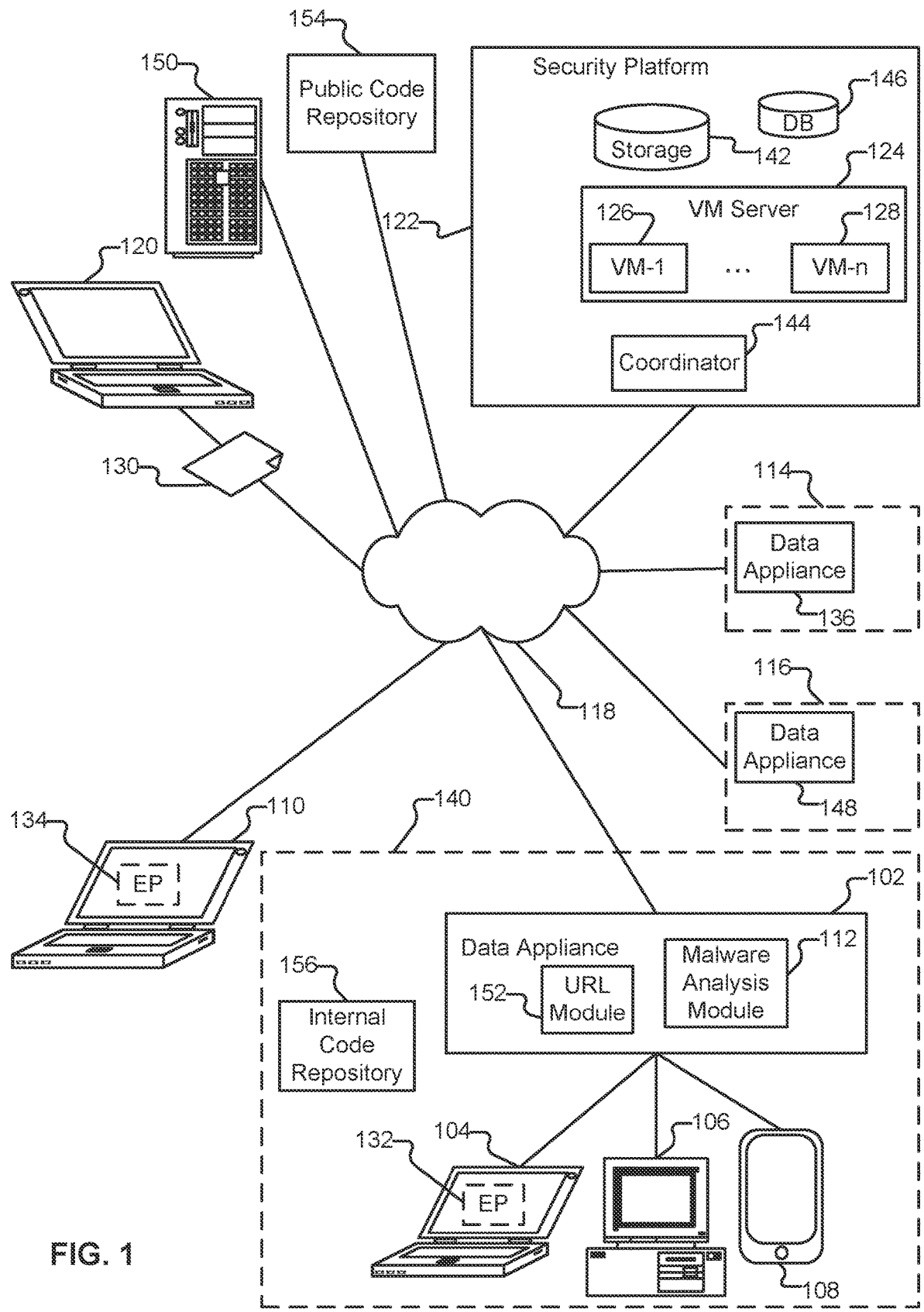
FIG. 1 illustrates an example of an environment in which malicious applications are detected and prevented from causing harm.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

I. Overview

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices), and in various implementations, certain operations can be implemented in special purpose hardware, such as an ASIC or FPGA.

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provide higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™ Citrix® Netscaler SDX™, KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

II. Example Environment

FIG. 1 illustrates an example of an environment in which malicious applications ("malware") are detected and prevented from causing harm. As will be described in more detail below, malware classifications (e.g., as determined by security platform 122) can be variously shared and/or refined among various entities included in the environment shown in FIG. 1. And, using techniques described herein, devices, such as endpoint client devices 104-110 can be protected from such malware.

The term "application" is used throughout the Specification to collectively refer to programs, bundles of programs, manifests, packages, etc., irrespective of form/platform. An "application" (also referred to herein as a "sample") can be a standalone file (e.g., a calculator application having the filename "calculator.apk" or "calculator.exe") and can also be an independent component of another application (e.g., a mobile advertisement SDK or library embedded within the calculator app).

"Malware" as used herein refers to an application that engages in behaviors, whether clandestinely or not (and whether illegal or not), of which a user does not approve/would not approve if fully informed. Examples of malware include Trojans, viruses, rootkits, spyware, hacking tools, keyloggers, etc. One example of malware is a desktop application that collects and reports to a remote server the end user's location (but does not provide the user with location-based services, such as a mapping service). Another example of malware is a malicious Android Application Package .apk (APK) file that appears to an end user to be a free game, but stealthily sends SMS premium messages (e.g., costing $10 each), running up the end user's phone bill. Another example of malware is an Apple iOS flashlight application that stealthily collects the user's contacts and sends those contacts to a spammer. Other forms of malware can also be detected/thwarted using the techniques described herein (e.g., ransomware). Further, while malware signatures are described herein as being generated for malicious applications, techniques described herein can also be used in various embodiments to generate profiles for other kinds of applications (e.g., adware profiles, goodware profiles, etc.).

Techniques described herein can be used in conjunction with a variety of platforms (e.g., desktops, mobile devices, gaming platforms, embedded systems, etc.) and/or a variety of types of applications (e.g., Android .apk files, iOS applications, Windows PE files, Adobe Acrobat PDF files, etc.). In the example environment shown in FIG. 1, client devices 104-108 are a laptop computer, a desktop computer, and a tablet (respectively) present in an enterprise network 140. Client device 110 is a laptop computer present outside of enterprise network 140.

Data appliance 102 is configured to enforce policies regarding communications between client devices, such as client devices 104 and 106, and nodes outside of enterprise network 140 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content (including those based on rules applied by URL module 152), files exchanged through instant messaging programs, and/or other file transfers. In some embodiments, data appliance 102 is also configured to enforce policies with respect to traffic that stays within enterprise network 140.

Although illustrated as a single element in FIG. 1, enterprise network 140 can comprise multiple networks, any/each of which can include one or multiple data appliances or other components that embody techniques described herein. For example, the techniques described herein can be deployed by large, multi-national companies (or other entities) with multiple offices in multiple geographical locations. And, while client devices 104-108 are illustrated in FIG. 1 as connecting directly to data appliance 102, it is to be understood that one or more intermediate nodes (e.g., routers, switches, and/or proxies) can be and typically are interposed between various elements in enterprise network 140.

Figure 2A:
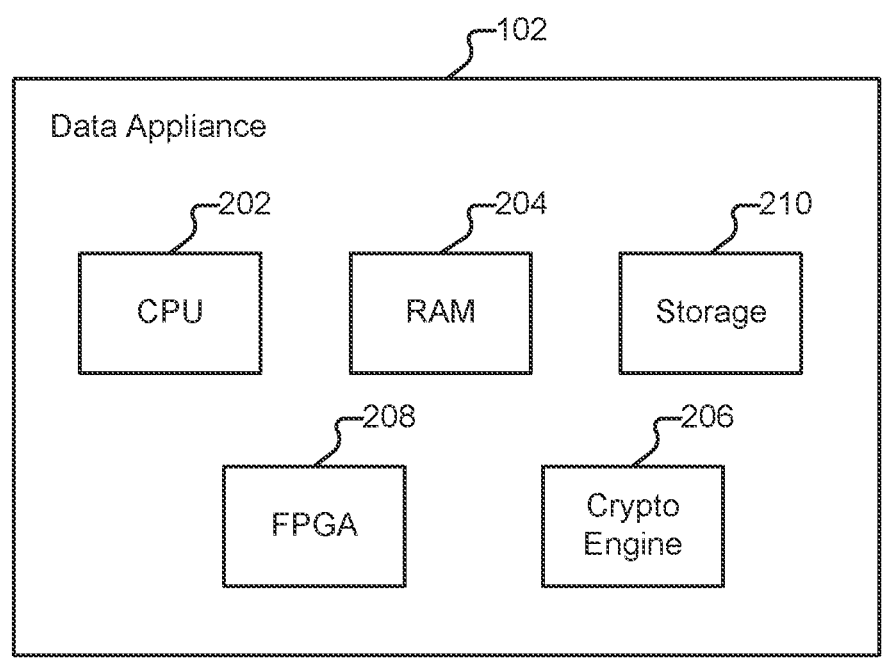
FIG. 2A illustrates an embodiment of a data appliance.

An embodiment of a data appliance is shown in FIG. 2A. The example shown is a representation of physical components that are included in data appliance 102, in various embodiments. Specifically, data appliance 102 includes a high performance multi-core Central Processing Unit (CPU) 202 and Random Access Memory (RAM) 204. Data appliance 102 also includes a storage 210 (such as one or more hard disks or solid state storage units). In various embodiments, data appliance 102 stores (whether in RAM 204, storage 210, and/or other appropriate locations) information used in monitoring enterprise network 140 and implementing disclosed techniques. Examples of such information include application identifiers, content identifiers, user identifiers, requested URLs, IP address mappings, policy and other configuration information, signatures, hostname/URL categorization information, malware profiles, and machine learning models. Data appliance 102 can also include one or more optional hardware accelerators. For example, data appliance 102 can include a cryptographic engine 206 configured to perform encryption and decryption operations, and one or more Field Programmable Gate Arrays (FPGAs) 208 configured to perform matching, act as network processors, and/or perform other tasks.

Functionality described herein as being performed by data appliance 102 can be provided/implemented in a variety of ways. For example, data appliance 102 can be a dedicated device or set of devices. The functionality provided by data appliance 102 can also be integrated into or executed as software on a general purpose computer, a computer server, a gateway, and/or a network/routing device. In some embodiments, at least some services described as being provided by data appliance 102 are instead (or in addition) provided to a client device (e.g., client device 104 or client device 110) by software executing on the client device (e.g., endpoint protection application 132).

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable. One example of a component included in data appliance 102 in various embodiments is an application identification engine which is configured to identify an application (e.g., using various application signatures for identifying applications based on packet flow analysis). For example, the application identification engine can determine what type of traffic a session involves, such as Web Browsing—Social Networking; Web Browsing—News; SSH; and so on.

Figure 2B:
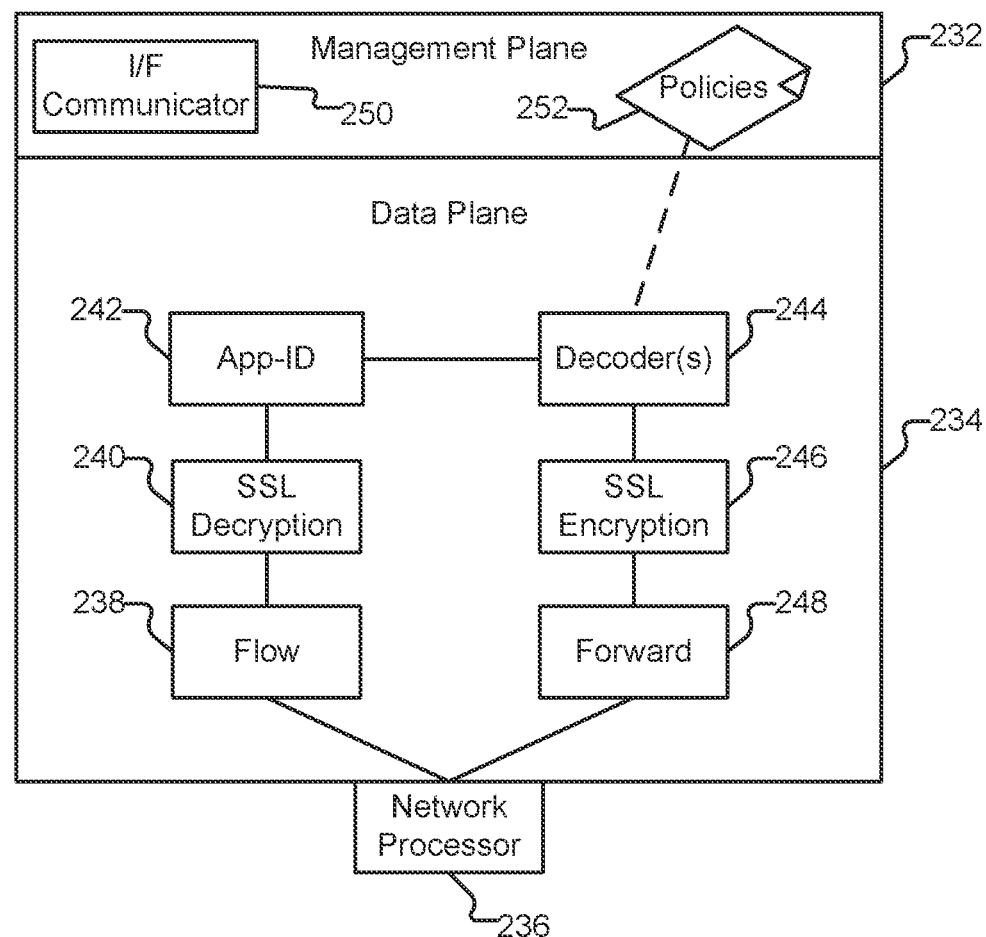
FIG. 2B is a functional diagram of logical components of an embodiment of a data appliance.

FIG. 2B is a functional diagram of logical components of an embodiment of a data appliance. The example shown is a representation of logical components that can be included in data appliance 102 in various embodiments. Unless otherwise specified, various logical components of data appliance 102 are generally implementable in a variety of ways, including as a set of one or more scripts (e.g., written in Java, python, etc., as applicable).

As shown, data appliance 102 comprises a firewall, and includes a management plane 232 and a data plane 234. The management plane is responsible for managing user interactions, such as by providing a user interface for configuring policies and viewing log data. The data plane is responsible for managing data, such as by performing packet processing and session handling.

Network processor 236 is configured to receive packets from client devices, such as client device 108, and provide them to data plane 234 for processing. Whenever flow module 238 identifies packets as being part of a new session, it creates a new session flow. Subsequent packets will be identified as belonging to the session based on a flow lookup. If applicable, SSL decryption is applied by SSL decryption engine 240. Otherwise, processing by SSL decryption engine 240 is omitted. Decryption engine 240 can help data appliance 102 inspect and control SSL/TLS and SSH encrypted traffic, and thus help to stop threats that might otherwise remain hidden in encrypted traffic. Decryption engine 240 can also help prevent sensitive content from leaving enterprise network 140. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 242 is configured to determine what type of traffic a session involves. As one example, application identification engine 242 can recognize a GET request in received data and conclude that the session requires an HTTP decoder. In some cases, e.g., a web browsing session, the identified application can change, and such changes will be noted by data appliance 102. For example, a user may initially browse to a corporate Wiki (classified based on the URL visited as "Web Browsing—Productivity") and then subsequently browse to a social networking site (classified based on the URL visited as "Web Browsing—Social Networking"). Different types of protocols have corresponding decoders 244.

Based on the determination made by application identification engine 242, the packets are sent to an appropriate decoder 244. Decoder 244 is configured to assemble packets (which may be received out of order) into the correct order, perform tokenization, and extract out information. Decoder 244 also performs signature matching to determine what should happen to the packet. As needed, SSL encryption engine 246 can re-encrypt decrypted data. Packets are forwarded using a forward module 248 for transmission (e.g., to a destination).

As also shown in FIG. 2B, policies 252 are received and stored in management plane 232. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (I/F) communicator 250 is provided for management communications (e.g., via (REST) APIs, messages, or network protocol communications or other communication mechanisms).

III. Security Platform

Returning to FIG. 1, in various embodiments, security platform 122 is configured to provide a variety of services (including to data appliance 102), including analyzing samples (e.g., of documents, applications, etc.) for maliciousness, categorizing applications, categorizing domains/URLs/URIs, etc.

Suppose a malicious individual (using system 120) has created malware 130. The malicious individual hopes that a client device, such as client device 104, will execute a copy of malware 130, compromising the client device, and causing the client device to become a bot in a botnet. The compromised client device can then be instructed to perform tasks (e.g., cryptocurrency mining, or participating in denial of service attacks) and to report information to an external entity, such as command and control (C&C) server 150, as well as to receive instructions from C&C server 150, as applicable.

Suppose data appliance 102 has intercepted an email sent (e.g., by system 120) to a user, "Alice," who operates client device 104 as an employee of ACME Corporation (who maintains enterprise network 140). A copy of malware 130 has been attached by system 120 to the message. As an alternate, but similar scenario, data appliance 102 could intercept an attempted download by client device 104 of malware 130 (e.g., from a website). In either scenario, data appliance 102 determines whether a signature for the file (e.g., the email attachment or website download of malware 130) is present on data appliance 102. A signature, if present, can indicate that a file is known to be safe (e.g., is whitelisted), and can also indicate that the file is known to be malicious (e.g., is blacklisted).

In various embodiments, data appliance 102 is configured to work in cooperation with security platform 122. As one example, security platform 122 can provide to data appliance 102 a set of signatures of known-malicious files (e.g., as part of a subscription). If a signature for malware 130 (e.g., an MD5 hash of malware 130) is included in the set of signatures, data appliance 102 can prevent the transmission of malware 130 to client device 104 accordingly (e.g., by detecting that an MD5 hash of the email attachment sent to client device 104 matches the MD5 hash of malware 130). Security platform 122 can also provide to data appliance 102 a list of known malicious domains and/or IP addresses, allowing data appliance 102 to block traffic between enterprise network 140 and C&C server 150 (e.g., where C&C server 150 is known to be malicious). The list of malicious domains (and/or IP addresses) can also help data appliance 102 determine when one of its nodes has been compromised. For example, if client device 104 attempts to contact C&C server 150, such attempt is a strong indicator that client 104 has been compromised by malware (and remedial actions should be taken accordingly, such as quarantining client device 104 from communicating with other nodes within enterprise network 140). Security platform 122 can also provide other types of information to data appliance 102 (e.g., as part of a subscription) such as a set of machine learning models usable by data appliance 102 to perform inline analysis of files.

A variety of actions can be taken by data appliance 102 if no signature for an attachment is found, in various embodiments. As a first example, data appliance 102 can fail-safe, by blocking transmission of any attachments not whitelisted as benign (e.g., not matching signatures of known good files). A potential drawback of this approach is that there may be many legitimate attachments unnecessarily blocked as potential malware when they are in fact benign. As a second example, data appliance 102 can fail-danger, by allowing transmission of any attachments not blacklisted as malicious (e.g., not matching signatures of known bad files). A potential drawback of this approach is that newly created malware (previously unseen by platform 122) will not be prevented from causing harm. As a third example, data appliance 102 can be configured to provide the file (e.g., malware 130) to security platform 122 for static/dynamic analysis, to determine whether it is malicious and/or to otherwise classify it. A variety of actions can be taken by data appliance 102 while analysis by security platform 122 of the attachment (for which a signature is not already present) is performed. As a first example, data appliance 102 can prevent the email (and attachment) from being delivered to Alice until a response is received from security platform 122. Assuming platform 122 takes approximately 15 minutes to thoroughly analyze a sample, this means that the incoming message to Alice will be delayed by 15 minutes. Since, in this example, the attachment is malicious, such a delay will not impact Alice negatively. In an alternate example, suppose someone has sent Alice a time sensitive message with a benign attachment for which a signature is also not present. Delaying delivery of the message to Alice by 15 minutes will likely be viewed (e.g., by Alice) as unacceptable. As will be described in more detail below, an alternate approach is to perform at least some real-time analysis on the attachment on data appliance 102 (e.g., while awaiting a verdict from platform 122). If data appliance 102 can independently determine whether the attachment is malicious or benign, it can take an initial action (e.g., block or allow delivery to Alice), and can adjust/take additional actions once a verdict is received from security platform 122, as applicable.

Security platform 122 stores copies of received samples in storage 142 and analysis is commenced (or scheduled, as applicable). One example of storage 142 is an Apache Hadoop Cluster (HDFS). Results of analysis (and additional information pertaining to the applications) are stored in database 146. In the event an application is determined to be malicious, data appliances can be configured to automatically block the file download based on the analysis result.

Further, a signature can be generated for the malware and distributed (e.g., to data appliances such as data appliances 102, 136, and 148) to automatically block future file transfer requests to download the file determined to be malicious.

In various embodiments, security platform 122 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 122 can be implemented across a scalable infrastructure comprising multiple such servers, solid state drives, and/or other applicable high-performance hardware. Security platform 122 can comprise several distributed components, including components provided by one or more third parties. For example, portions or all of security platform 122 can be implemented using the Amazon Elastic Compute Cloud (EC2) and/or Amazon Simple Storage Service (S3). Further, as with data appliance 102, whenever security platform 122 is referred to as performing a task, such as storing data or processing data, it is to be understood that a sub-component or multiple sub-components of security platform 122 (whether individually or in cooperation with third party components) may cooperate to perform that task. As one example, security platform 122 can optionally perform static/dynamic analysis in cooperation with one or more virtual machine (VM) servers, such as VM server 124.

An example of a virtual machine server is a physical machine comprising commercially available server-class hardware (e.g., a multi-core processor, 32+ Gigabytes of RAM, and one or more Gigabit network interface adapters) that runs open source and/or commercially available virtualization software, such as Linux Kernel based Virtual Machine (KVM), VMware ESXi, Citrix XenServer, and/or Microsoft Hyper-V. In some embodiments, the virtual machine server is omitted. Further, a virtual machine server may be under the control of the same entity that administers security platform 122, but may also be provided by a third party. As one example, the virtual machine server can rely on EC2, with the remainder portions of security platform 122 provided by dedicated hardware owned by and under the control of the operator of security platform 122. VM server 124 is configured to provide one or more virtual machines 126-128 for emulating client devices. The virtual machines can execute a variety of operating systems and/or versions thereof. Observed behaviors resulting from executing applications in the virtual machines are logged and analyzed (e.g., for indications that the application is malicious). In some embodiments, log analysis is performed by the VM server (e.g., VM server 124). In other embodiments, analysis is performed at least in part by other components of security platform 122, such as a coordinator 144.

In various embodiments, security platform 122 makes available the results of its analysis of samples via a list of signatures (and/or other identifiers) to data appliance 102 as part of a subscription. For example, security platform 122 can periodically send a content package that identifies malware apps (e.g., daily, hourly, or some other interval, and/or based on an event configured by one or more policies). An example content package includes a listing of identified malware apps, with information such as a package name, a hash value for uniquely identifying the app, and a malware name (and/or malware family name) for each identified malware app. The subscription can cover the analysis of just those files intercepted by data appliance 102 and sent to security platform 122 by data appliance 102, and can also cover signatures of all malware known to security platform 122 (or subsets thereof, such as just mobile malware but not other forms of malware (e.g., PDF malware)). Platform 122 can also make available other types of information, such as machine learning models that can help data appliance 102 detect malware (e.g., through techniques other than hash-based signature matching).

In various embodiments, security platform 122 is configured to provide security services to a variety of entities in addition to (or, as applicable, instead of) an operator of data appliance 102. For example, other enterprises, having their own respective enterprise networks 114 and 116, and their own respective data appliances 136 and 148, can contract with the operator of security platform 122. Other types of entities can also make use of the services of security platform 122. For example, an Internet Service Provider (ISP) providing Internet service to client device 110 can contract with security platform 122 to analyze applications which client device 110 attempts to download. As another example, the owner of client device 110 can install endpoint protection software 134 on client device 110 that communicates with security platform 122 (e.g., to receive content packages from security platform 122, use the received content packages to check attachments in accordance with techniques described herein, and transmit applications to security platform 122 for analysis).

In various embodiments, security platform 122 is configured to collaborate with one or more third party services. As one example, security platform 122 can provide malware scanning results (and other information, as applicable) to a third-party scanner service (e.g., VirusTotal). Security platform 122 can similarly incorporate information obtained from a third-party scanner service (e.g., maliciousness verdicts from entities other than security platform 122) into its own information (e.g., information stored in database 146 or another appropriate repository of information).

IV. Analyzing Samples Using Static/Dynamic Analysis

Figure 3:
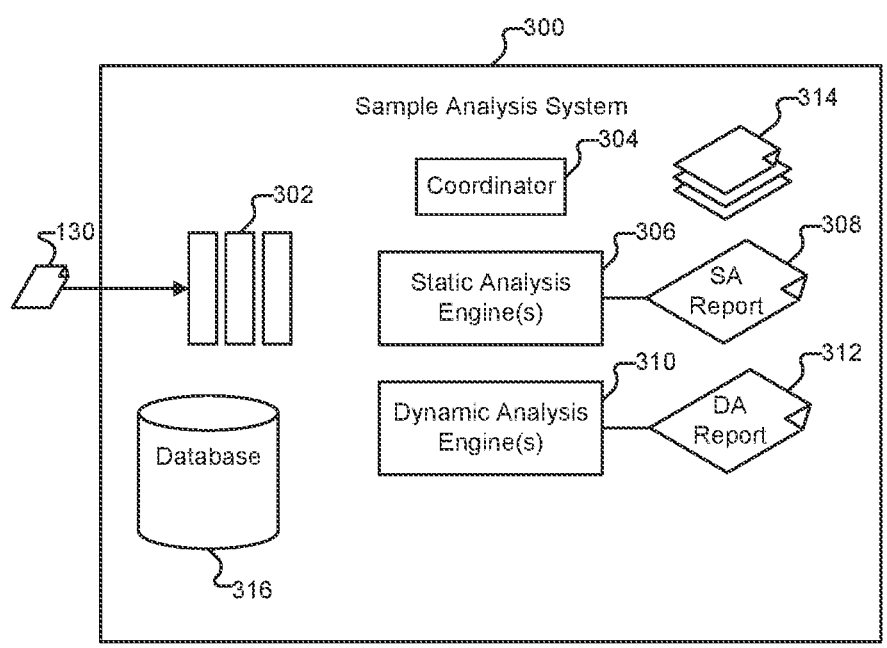
FIG. 3 illustrates an example of logical components that can be included in a system for analyzing samples.

FIG. 3 illustrates an example of logical components that can be included in a system for analyzing samples. Analysis system 300 can be implemented using a single device. For example, the functionality of analysis system 300 can be implemented in a malware analysis module 112 incorporated into data appliance 102. Analysis system 300 can also be implemented, collectively, across multiple distinct devices. For example, the functionality of analysis system 300 can be provided by security platform 122.

In various embodiments, analysis system 300 makes use of lists, databases, or other collections of known safe content and/or known bad content (collectively shown in FIG. 3 as collection 314). Collection 314 can be obtained in a variety of ways, including via a subscription service (e.g., provided by a third party) and/or as a result of other processing (e.g., performed by data appliance 102 and/or security platform 122). Examples of information included in collection 314 are: URLs, domain names, and/or IP addresses of known malicious servers; URLs, domain names, and/or IP addresses of known safe servers; URLs, domain names, and/or IP addresses of known command and control (C&C) domains; signatures, hashes, and/or other identifiers of known malicious applications; signatures, hashes, and/or other identifiers of known safe applications; signatures, hashes, and/or other identifiers of known malicious files (e.g., Android exploit files); signatures, hashes, and/or other identifiers of known safe libraries; and signatures, hashes, and/or other identifiers of known malicious libraries.

A. Ingestion

In various embodiments, when a new sample is received for analysis (e.g., an existing signature associated with the sample is not present in analysis system 300), it is added to queue 302. As shown in FIG. 3, application 130 is received by system 300 and added to queue 302.

B. Static Analysis

Coordinator 304 monitors queue 302, and as resources (e.g., a static analysis worker) become available, coordinator 304 fetches a sample from queue 302 for processing (e.g., fetches a copy of malware 130). In particular, coordinator 304 first provides the sample to static analysis engine 306 for static analysis. In some embodiments, one or more static analysis engines are included within analysis system 300, where analysis system 300 is a single device. In other embodiments, static analysis is performed by a separate static analysis server that includes a plurality of workers (i.e., a plurality of instances of static analysis engine 306).

The static analysis engine (implementable via a set of scripts authored in an appropriate scripting language) obtains general information about the sample, and includes it (along with heuristic and other information, as applicable) in a static analysis report 308. The report can be created by the static analysis engine, or by coordinator 304 (or by another appropriate component) which can be configured to receive the information from static analysis engine 306. In some embodiments, the collected information is stored in a database record for the sample (e.g., in database 316), instead of or in addition to a separate static analysis report 308 being created (i.e., portions of the database record form the report 308). In some embodiments, the static analysis engine also forms a verdict with respect to the application (e.g., "safe," "suspicious," or "malicious"). As one example, the verdict can be "malicious" if even one "malicious" static feature is present in the application (e.g., the application includes a hard link to a known malicious domain). As another example, points can be assigned to each of the features (e.g., based on severity if found; based on how reliable the feature is for predicting malice; etc.) and a verdict can be assigned by static analysis engine 306 (or coordinator 304, if applicable) based on the number of points associated with the static analysis results.

C. Dynamic Analysis

Once static analysis is completed, coordinator 304 locates an available dynamic analysis engine 310 to perform dynamic analysis on the application. As with static analysis engine 306, analysis system 300 can include one or more dynamic analysis engines directly. In other embodiments, dynamic analysis is performed by a separate dynamic analysis server that includes a plurality of workers (i.e., a plurality of instances of dynamic analysis engine 310).

Each dynamic analysis worker manages a virtual machine instance. In some embodiments, results of static analysis (e.g., performed by static analysis engine 306), whether in report form (308) and/or as stored in database 316, or otherwise stored, are provided as input to dynamic analysis engine 310. For example, the static report information can be used to help select/customize the virtual machine instance used by dynamic analysis engine 310 (e.g., Microsoft Windows 7 SP 2 vs. Microsoft Windows 10 Enterprise, or iOS 11.0 vs. iOS 12.0). Where multiple virtual machine instances are executed at the same time, a single dynamic analysis engine can manage all of the instances, or multiple dynamic analysis engines can be used (e.g., with each managing its own virtual machine instance), as applicable. During the dynamic portion of the analysis, actions taken by the application (including network activity) are analyzed.

In various embodiments, static analysis of a sample is omitted or is performed by a separate entity, as applicable. As one example, traditional static and/or dynamic analysis may be performed on files by a first entity. Once it is determined (e.g., by the first entity) that a given file is suspicious or malicious, the file can be provided to a second entity (e.g., the operator of security platform 122) specifically for additional analysis with respect to the malware's use of network activity (e.g., by a dynamic analysis engine 310).

The environment used by analysis system 300 is instrumented/hooked such that behaviors observed while the application is executing are logged as they occur (e.g., using a customized kernel that supports hooking and logcat). Network traffic associated with the emulator is also captured (e.g., using pcap). The log/network data can be stored as a temporary file on analysis system 300, and can also be stored more permanently (e.g., using HDFS or another appropriate storage technology or combinations of technology, such as MongoDB). The dynamic analysis engine (or another appropriate component) can compare the connections made by the sample to lists of domains, IP addresses, etc. (314) and determine whether the sample has communicated (or attempted to communicate) with malicious entities.

As with the static analysis engine, the dynamic analysis engine stores the results of its analysis in database 316 in the record associated with the application being tested (and/or includes the results in report 312 as applicable). In some embodiments, the dynamic analysis engine also forms a verdict with respect to the application (e.g., "safe," "suspicious," or "malicious"). As one example, the verdict can be "malicious" if even one "malicious" action is taken by the application (e.g., an attempt to contact a known malicious domain is made, or an attempt to exfiltrate sensitive information is observed). As another example, points can be assigned to actions taken (e.g., based on severity if found; based on how reliable the action is for predicting malice; etc.) and a verdict can be assigned by dynamic analysis engine 310 (or coordinator 304, if applicable) based on the number of points associated with the dynamic analysis results. In some embodiments, a final verdict associated with the sample is made based on a combination of report 308 and report 312 (e.g., by coordinator 304).

V. Inline Package Name Based Supply Chain Attack Detection and Prevention

A. Introduction

Package registries (e.g., provided by registry maintainers) are centralized repositories that software developers can use to find and install hosted packages, and to automate processes such as installing and updating dependencies. Examples include PyPI (for Python), npm (for Node.JS and JavaScript), and RubyGems (for Ruby). The package management ecosystem (also referred to herein for simplicity as "package managers") helps developers efficiently share their code and also to incorporate third-party code into their own projects. Package managers typically comprise two main components: a client application (used by developers on their endpoint devices) that provides access to packages, and a web-based application that serves packages. Using Python as an example, "pip" is an example of a package management client application, and "pypi.org" is an example of the corresponding web application. Typically, registry maintainers require that package maintainers (those who submit packages to package registries) create accounts with the web application. Developers (those who want to download/incorporate packages into their own projects) are typically not required to create accounts (though may if they choose to do so).

Unfortunately, the package management ecosystem can be leveraged by nefarious individuals/organizations to facilitate the distribution of malware. One class of attack that can be perpetrated is account compromise (e.g., where a package maintainer's account with a repository is compromised by an attacker). In an example of such an attack, a nefarious individual could compromise a legitimate package authored by a legitimate maintainer and replace the legitimate code with compromised code (for download by others). Another class of attack takes advantage of package names. A first example of this attack type is referred to as typosquatting, where a malicious author submits a package to a repository with a name that is similar to the name of another (often popular) package, but varies by one or two characters (or other appropriate edit/Levenshtein distance). When an unsuspecting developer inadvertently requests the misspelled package, e.g., "python-toolkit-for-grapics" instead of "python-toolkit-for-graphics," the malicious package will be installed by the package manager instead of the legitimate one. A second, similar example of this attack is referred to as combosquatting, in which the malicious author submits a package to a repository with a name that is confusingly similar to the name of another package (e.g., "pykit-for-graphics" instead of "python-toolkit-for-graphics"). A third example is dependency confusion, described with reference to an employee ("Bob") who develops software for ACME Corporation. While the example is described in the context of a Python code development environment, other ecosystems (e.g., JavaScript/npm) can be similarly exploited.

Installation of a given package will often be dependent on the presence of other packages. If any required packages are missing (i.e., those upon which the package to be installed is dependent), the package manager will identify and retrieve/install them as well. In typical development environments, developers make use of a mix of internal packages (e.g., packages authored by a company for internal/proprietary use by/within the company) and public packages (e.g., open source or other packages made publicly available at repositories). The internal packages are stored in an internal repository which has a corresponding internal package index. As mentioned above, public packages are stored with a public repository (e.g., at pypi.org) which has a corresponding public package index.

Suppose Bob is working on an internal application for ACME Corporation. As part of his development, he needs to install "ACME-CORE.py," an internal package that includes various functionality commonly used in internal ACME Corporation applications. ACME-CORE.py is in turn dependent on other internal packages, and also various public packages.

In order to install ACME-CORE.py, Bob uses the pip client at the command line as follows:

pip install—index https://pypi.org/simple—extra-index-url https://dev.acmecorporation.com/repository ACME-CORE.py The command line arguments "—index" and "—extra-index-url" instruct the pip client to look for any dependencies (and the ACME-CORE.py package itself) both in the ACME Corporation internal package repository and the pypi.org public repository, download them, and install them on Bob's computer. Of note, pip will check both repositories for all required packages. If a given package is only present in one repository, it installs that package. However, identically named packages can potentially be present in both the internal repository and the public one. "Dependency confusion" is used to refer to uncertainty of which copy of a package should be installed if a given package name is present in both repositories. Pip defaults to installing from the repository hosting a copy of the package with the highest version number. Other package managers may have other default behaviors (e.g., preferring the public package over the internal one, irrespective of version number).

If a nefarious individual is able to determine the name of an internal ACME Corporation package (e.g., "ACME-CORE-helper.py," on which "ACME-CORE.py" is dependent), he can publish a malicious package having the same name ("ACME-CORE-helper.py") at pypi.org, assign it a high version number, and cause Bob to automatically download and install the malicious package (instead of the private, benign package).

While it might seem unlikely that the names of private packages would be possible for an outside attacker to obtain (and thus be able to exploit), that is unfortunately not the case. As one example, in the summer of 2020, source code shown in FIG. 4 (in its package.json file) was found in a piece of Node.js source code hosted at github.com. Illustrated in FIG. 4 are both publicly hosted npm packages (402) and packages (404) whose names were not present on the npm registry (at the time)—believed to be internal PayPal packages. During the build process, internal package.json files (such as the one shown in FIG. 4) often wind up being embedded in public JavaScript files (e.g., potentially across many different websites that make use of PayPal services to collect payments).

B. Preventing Package Name Based Attacks

Various elements shown in FIG. 1 can be used to help prevent package name based attacks such as those described above. As previously mentioned, one task that can be performed by data appliance 102 is the enforcement of policies against network traffic between nodes inside network 140 and nodes outside network 140. Suppose that in the environment shown in FIG. 1, client device 106 is Bob's computer. And further, suppose that code repository 154 is a web-based application that serves packages (such as pypi.org). Data appliance 102 (optionally working in cooperation with security platform 122) can evaluate requests made by client device 106 (and corresponding responses from code repository 154) and take remedial actions if a determination is made that, for example, client device 106 is potentially involved in a package name based attack. Further, in addition to helping protect client device 106 (and other client devices within network 140), security platform 122 can help protect other client devices in other networks (e.g., networks 114 and 116) based on information it learns from data appliance 102.

1. Identifying Package Requests

The following are examples of strings used by various package managers that fetch metadata from their respective repositories on a per-package basis:
* pip: https://pypi.python[.]org/simple/$pkg/* npm: https://registry.npmjs[.]org/$pkg
* mvn: https://repo.maven.apache[.]org/maven2/$group/$artifact/maven-metadata.xml or https://repo.maven.apache[.]org/maven2/$group/$artifact/$version/$artifact-$version.pom
* nuget: https://www.nuget[.]org/api/v2/FindPackagesById( )?id=$pkg or https://www.nuget[.]org/api/v2/FindPackagesById( )?$filter=IsLatestVersion&$orderby=Version desc&$top=1&id=$pkg
* Go: https://github[.]com/$scope/$pkg (the domain can vary)

URL module 152 is configured to evaluate URLs in requests made by clients in network 140 against policies 252. As an example, a policy included in policies 252 could specify that users of network 140 are not allowed to visit pornographic websites. If such a request is made (e.g., via client device 108 requesting access to sexytime.example.com), the request can be blocked/logged/etc., as applicable. In various embodiments, URL module 152 is configured to identify, in inline traffic, metadata URLs used by package managers (examples of which are provided above). In particular, URL module 152 can derive the name of the package Bob is trying to install (e.g., from the request) and based on the response (e.g., from the public repository), determine whether the implicated package name exists in the public repository. In some situations (e.g., depending on which repository is being contacted), data appliance 102 may not receive sufficient information in the response to determine whether or not the public repository includes the requested package. Data appliance 102 can address this scenario by using information detected in the request (e.g., the determined package name) to perform its own check (i.e., directly request the same metadata from the public repository and note the response it receives). If the response received from the repository indicates that the package is not present ("a nonexisting package"), whether as determined from inline traffic or by direct query, data appliance 102 (and/or security platform 122) can perform additional processing.

2. Handling Nonexisting Packages

As described above, "ACME-CORE.py" is dependent on both internal and public packages. When Bob executes his "pip install" command for the package, URL module 152 will observe a parallel set of requests, for all dependencies, to both public code repository 154 and internal code repository 156 (which can be located within network 140 or can be located outside of network 140 but otherwise be "internal" to ACME (e.g., through the use of access controls)). As mentioned above, ACME-CORE-helper.py is an example of an internally hosted dependency of ACME-CORE.py. As such, the pip client executing on client device 106 will receive a "nonexisting package" response from public repository 154, but a copy of the package from internal repository 156. Noting the nonexisting package response, data appliance 102 can take a variety of actions. As a first example, data appliance 102 can immediately add a URL corresponding to the request for ACME-CORE-helper.py from public repository 154 to a blocklist. Any subsequent requests from within network 140 for ACME-CORE-helper.py from public repository 154 will be blocked, meaning that even if a nefarious individual subsequently registers a malicious copy of ACME-CORE-helper.py at public repository 154 (e.g., with a higher version number than the internal copy of ACME-CORE-helper.py), the malicious copy will be prevented from being installed within network 140.

Data appliance 102 (or, as applicable, security platform 122) can perform a variety of checks before taking additional action with respect to the URL corresponding to ACME-CORE-helper.py at public server 154. One example of a check is for data appliance 102 (or, as applicable, security platform 122) to confirm the report that ACME-CORE-helper.py is a nonexisting package by making its own request for the URL instead of relying on analysis of the response to client 106 (e.g., to ensure that a legitimate, existing publicly available package is not erroneously blocked). Another example of a check is to track the number of times a request has been made within network 140 (or, as applicable, across all of networks 114, 116, and 140) for ACME-CORE-helper.py, and block the URL once the threshold number of requests has been met. As applicable, the addition of packages to the blocklists of data appliances can be reported to security platform 122 (e.g., for distribution to other data appliances, and/or for monitoring).

Of note, handling the detection of nonexisting packages in accordance with embodiments of techniques described herein can be used not only to prevent dependency confusion attacks, but other kinds of package name attacks (e.g., typosquatting and/or combosquatting attacks). As an example, suppose Bob intends to include a public package, "graphics-library.py" in code he is writing, but inadvertently refers to it as "grphics-library.py" (a nonexisting package). During the build process, Bob may immediately notice his mistake, correct it, and never make the mistake again. However, it could also be the case that he (and/or others) routinely mistypes the nonexisting package name. By automatically blocking access to such commonly referenced nonexisting packages (whether immediately, or after a threshold number of attempted accesses has been reached), a malicious individual who later attempts to take advantage of such propensity to mistype package names will be thwarted.

3. Monitoring and Notification

In various embodiments, security platform 122 (or data appliance 102, as applicable) is configured to monitor detected nonexisting packages (e.g., by periodically checking whether a corresponding package is ultimately added to the public repository). If a change in status is detected (i.e., the nonexisting package subsequently becomes available), notifications can be sent (e.g., to data appliance 102, to an administrator of network 140, and/or other applicable entity). The presence of such newly available packages can be indicative of a variety of package name attacks, including dependency confusion, typosquatting, or combosquatting attacks being perpetrated. The presence of such newly available packages can also be benign (e.g., because ACME Corporation has chosen to make its internal package public, or due to a legitimate developer inadvertently using the same name for a new public package as ACME's internal package name). As applicable, security platform 122 (and/or data appliance 102) can be configured to receive reports of false positives (i.e., packages which should not be/should no longer be blocked) for review/removal from the block list.

4. Additional Embodiments

Some package managers do not fetch metadata on a per-package basis. Examples include RubyGems (gem), Packagist (composer), Debian (aptitude), Fedora (yum), and CocoaPods (pod). These package managers either fetch all metadata for a given install procedure at once, or on a per-sharding basis. In these situations, data appliance 102 may be unable to determine whether a given package included in the bundled request is a nonexisting package. Protection can nonetheless be provided against name attacks that use these package managers, in various embodiments, through use of an agent (e.g., endpoint protection application 132) executing on the developer's client device. In an example implementation, the agent can locally observe which packages the developer attempts to install, and then separately check (or report to data appliance 102 and/or security platform 122 to check) which packages are nonexisting.

The approaches described herein can also be adapted to be used to enforce particular resolutions of package name conflicts. As an example, as mentioned above, the default behavior of pip (when a package having a particular name is present both on an internal repository and a public repository) is to install the version with the highest version number. Techniques described herein can be used to determine that a conflict exists (i.e., both repositories have available packages with the name) and block access to the public repository's copy of the package.

For reasons such as faster download time or censorship bypass, developers may choose to download/incorporate packages into their own projects from mirrors of package registries, rather than the official ones. In such cases, the client behavior remains the same (e.g., fetching package metadata, choosing packages to install from internal/public registry, etc.). Only the package hosting domain and/or URL for the public registries differ. As an example, the official npm registry is https://registry.npmjs.org, and developers can use its public mirrors such as https://registry.npm.taobao.org or https://registry.npmmirror.com. Since the client behavior remains the same, the same techniques can help protect users of registry mirrors.

The list of mirrors of package registries can be automatically identified by correlating the URL patterns for a given domain with URL patterns of the official package registries using popular packages. As an example, the top five (can be K in implementation) downloaded PyPI packages in September 2022 according to https://pypistats.org/top are boto3, setuptools, urllib3, idna, botocore. Their metadata URLs would be https://pypi.python[.]org/simple/$pkg/. The firewall can check for base URLs that have the pattern $BASE_URL/$pkg/for the popular packages. The $BASE_URL would be public mirror that can be further added for monitoring and protection.

C. Example Process

Figure 5:
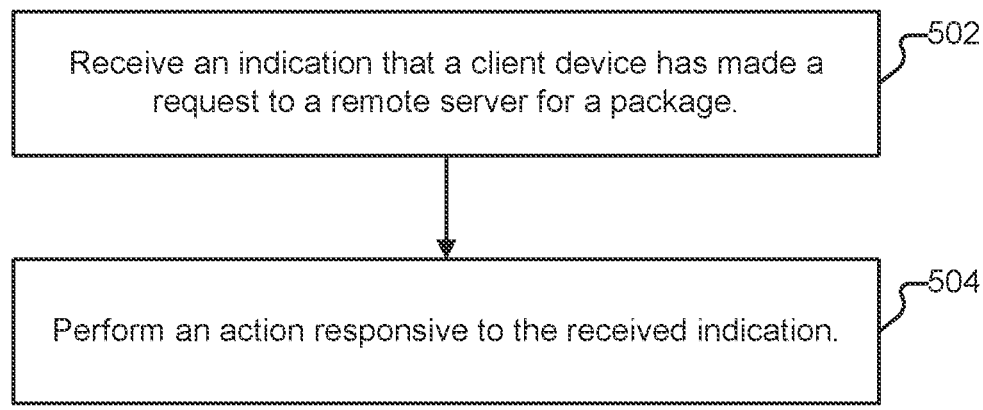
FIG. 5 illustrates an embodiment of a process for mitigating package name based attacks.

FIG. 5 illustrates an embodiment of a process for mitigating package name based attacks. In various embodiments, process 500 is performed by data appliance 102. In some embodiments, process 500 is at least partially performed by or in cooperation with security platform 122.

Process 500 begins at 502 when an indication is received that a client device has made a request to a remote server for a package. As an example, such an indication is received at 502 when data appliance 102 observes in network traffic Bob's request (via the pip client installed on client 106) to pypi.org for ACME-CORE-helper.py in connection with his install of ACME-CORE.py. As another example, such an indication could be received from an agent executing on Bob's machine when it observes Bob requesting a Debian or other package.

At 504, an action responsive to the indication received at 502 is performed. As one example, data appliance 102 can determine whether the request is associated with a blocked URL, and if so, prevent download of the package from the remote server. As another example, data appliance 102 can determine whether the request is associated with a nonexisting package, and if so, take further action (e.g., confirming whether the package is in fact nonexisting, checking/updating a count of previous requests for the reported nonexisting package, adding the URL to a block list, and/or reporting the URL (or other package information) to security platform 122).

Additional actions can also be taken, including asynchronously, to the action taken at 504. As one example, data appliance 102 (and/or security platform 122) can periodically monitor for a change in the availability of the nonexisting package at the remote server. If a change is detected, one or more alerts can be generated (as described above). As another example, URLs added to a block list (e.g., a block list associated with a data appliance) can be propagated (e.g., to other data appliances).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive an indication that a client device has made a request to a remote server for a package, wherein the remote server makes a plurality of packages publicly available for download, and wherein the requested package is included as a dependency of a software build;
determine that the requested package is a nonexisting package that is not available at the remote server;
responsive to the determination, perform analysis of whether the nonexisting package is one of a plurality of privately owned internal packages at a local repository and not present at the remote server, and at least one of whether a name of the nonexisting package is within a predetermined edit distance of a name of a malicious package, or whether the name of the nonexisting package shares a commonality with a name of a malicious package;
receive an alert in response to a determination that the nonexisting package has subsequently been made available by the remote server; and
perform, by a data appliance, a responsive action based on at least one result of the analysis; and
a memory coupled to the processor and configured to provide the processor with instructions.

2. The system of claim 1, wherein the indication is received in response to matching a regular expression against a Uniform Resource Locator (URL) included in the request.

3. The system of claim 1, wherein the indication is received during an inline observation of network traffic.

4. The system of claim 1, wherein the indication is received from an agent installed at the client device.

5. The system of claim 1, wherein performing the responsive action includes blocking a download from the remote server.

6. The system of claim 1, wherein performing the responsive action includes preventing the request from being delivered to the remote server.

7. The system of claim 1, wherein performing the responsive action includes increasing a count of a number of times the package has been requested.

8. The system of claim 7, wherein, in response to the count exceeding a threshold, the data appliance is configured to block access to the package.

9. The system of claim 1, wherein performing the responsive action includes adding a URL associated with the package to a block list.

10. The system of claim 9, wherein the URL is distributed to another data appliance for blocking by the another data appliance.

11. The system of claim 1, wherein the alert is provided by an external security system.

12. The system of claim 1, wherein the alert is generated by the data appliance.

13. A method, comprising:
receiving an indication that a client device has made a request to a remote server for a package, wherein the remote server makes a plurality of packages publicly available for download, and wherein the requested package is included as a dependency of a software build;
determining that the requested package is a nonexisting package that is not available at the remote server;
responsive to the determination, performing analysis of whether the nonexisting package is one of a plurality of privately owned internal packages at a local repository and not present at the remote server, and at least one of whether a name of the nonexisting package is within a predetermined edit distance of a name of a malicious package, or whether the name of the nonexisting package shares a commonality with a name of a malicious package;
receiving an alert in response to a determination that the nonexisting package has subsequently been made available by the remote server; and
performing, by a data appliance, a responsive action based on at least one result of the analysis.

14. The method of claim 13, wherein the indication is received in response to matching a regular expression against a Uniform Resource Locator (URL) included in the request.

15. The method of claim 13, wherein the indication is received during an inline observation of network traffic.

16. The method of claim 13, wherein the indication is received from an agent installed at the client device.

17. The method of claim 13, wherein performing the responsive action includes blocking a download from the remote server.

18. The method of claim 13, wherein performing the responsive action includes preventing the request from being delivered to the remote server.

19. The method of claim 13, wherein performing the responsive action includes increasing a count of a number of times the package has been requested.

20. The method of claim 19, wherein, in response to the count exceeding a threshold, the data appliance is configured to block access to the package.

21. The method of claim 13, wherein performing the responsive action includes adding a URL associated with the package to a block list.

22. The method of claim 21, wherein the URL is distributed to another data appliance for blocking by the another data appliance.

23. The method of claim 13, wherein the alert is provided by an external security system.

24. The method of claim 13, wherein the alert is generated by the data appliance.

25. A computer program product embodied in a non-transitory computer readable medium and comprising computer instructions which when executed by a processor cause the processor to:
receive an indication that a client device has made a request to a remote server for a package, wherein the remote server makes a plurality of packages publicly available for download, and wherein the requested package is included as a dependency of a software build;
determine that the requested package is a nonexisting package that is not available at the remote server;
responsive to the determination, perform analysis of whether the nonexisting package is one of a plurality of privately owned internal packages at a local repository and not present at the remote server, and at least one of whether a name of the nonexisting package is within a predetermined edit distance of a name of a malicious package, or whether the name of the nonexisting package shares a commonality with a name of a malicious package;
receive an alert in response to a determination that the nonexisting package has subsequently been made available by the remote server; and
perform, by a data appliance, a responsive action based on at least one result of the analysis.

* * * * *